(12) United States Patent
Choi et al.

(10) Patent No.: US 8,601,183 B2
(45) Date of Patent: Dec. 3, 2013

(54) APPARATUS AND METHOD FOR TRANSMITTING AND RECEIVING DATA IN ONE-TO-ONE COMMUNICATION

(75) Inventors: Jeong-Seok Choi, Gyeonggi-do (KR); Dae-Kwang Jung, Gyeonggi-do (KR); Hong-Seok Shin, Gyeonggi-do (KR); Kyung-Woo Lee, Gyeonggi-do (KR); Sung-Bum Park, Gyeonggi-do (KR); Ki-Uk Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 126 days.

(21) Appl. No.: 12/884,797

(22) Filed: Sep. 17, 2010

(65) Prior Publication Data
US 2011/0072174 A1  Mar. 24, 2011

(30) Foreign Application Priority Data
Sep. 21, 2009  (KR) .......................... 10-2009-0089073

(51) Int. Cl.
*G06F 3/00* (2006.01)
*G06F 5/00* (2006.01)

(52) U.S. Cl.
USPC .......................................................... 710/52

(58) Field of Classification Search
USPC .......................................................... 710/52
See application file for complete search history.

(56) References Cited

U.S. PATENT DOCUMENTS

| 7,212,538 B2 * | 5/2007 | Abrol et al. .................... 370/429 |
| 7,664,030 B2 * | 2/2010 | Sugaya .......................... 370/235 |
| 7,860,204 B2 * | 12/2010 | Furrer et al. ................... 375/358 |
| 7,944,820 B2 * | 5/2011 | Chan et al. ..................... 370/229 |

* cited by examiner

*Primary Examiner* — Chun-Kuan Lee
(74) *Attorney, Agent, or Firm* — The Farrell Law Firm, P.C.

(57) ABSTRACT

An apparatus and method for transmitting and receiving data in one-to-one communication are provided. A first buffer for temporarily storing file data and a second buffer for temporarily storing message data are connected to a data transmitter for transmitting data and a data receiver for receiving data, respectively or vice versa, according to a request for data transmission or reception. The buffer for storing file data and the buffer for storing message data are differently constructed, thereby reducing the waste of memories of the buffers and achieving the miniaturization and high-speed data transmission of a portable terminal device.

8 Claims, 3 Drawing Sheets

APPARATUS AND METHOD FOR TRANSMITTING AND RECEIVING DATA IN ONE-TO-ONE COMMUNICATION

PRIORITY

This application claims priority under 35 U.S.C. §119(a) to a Korean Patent Application filed in the Korean Intellectual Property Office on Sep. 21, 2009 and assigned Serial No. 10-2009-0089073, the entire disclosure of which is hereby incorporated by reference.

BACKGROUND OF THE INVENTION

1. Field of the Invention

The present invention relates generally to an apparatus and method for transmitting and receiving data, and more particularly, to an apparatus and method for transmitting and receiving data in one-to-one communication.

2. Description of the Related Art

Generally, a mobile communication terminal transmits and receives data using a data link control module in order to transmit large amounts of data such as moving picture files, as well as small amounts of data such as image files.

Such a data link control module includes a data transmission buffer for temporarily storing transmission data, a data transmitter for transmitting data, a data receiver for receiving data, a data reception buffer for temporarily storing received data, and a controller for controlling the above buffers, transmitter and receiver. The data transmission buffer and the data reception buffer have the same size.

For example, if a user requests data transmission, the controller temporarily stores data to be transmitted in the data transmission buffer and transmits the stored data to the data transmitter, so that the data transmitter outputs the transmitted data.

If a user requests data reception, the controller receives data through the data receiver, temporarily stores the received data in the data reception buffer, and transmits the stored data to a memory of the mobile communication terminal.

In this way, the conventional data link control module constructs the data transmission buffer and the data reception buffer to have the same size and temporarily stores data which is to be transmitted and data which is received in the data transmission buffer and the data reception buffer, respectively.

However, when transmitting and receiving a large amount of files on one-to-one communication, a transmitting side transmits data of a size corresponding to a large amount of files to a receiving side, and the receiving side transmits only a response message to data reception, such as an Acknowledgement (ACK) or negative Acknowledgement (NACK), to the transmitting side. Therefore, there is a remarkable difference between the amount of data received by the transmitting side and the amount of data received by the receiving side.

Thus, if the data transmission buffer and the data reception buffer have the same size, memories of the buffers are wasted and they are not suitable for the achievement of a small-sized portable terminal device and high-speed communication.

SUMMARY OF THE INVENTION

An aspect of the present invention is to address at least the above-mentioned problems and/or disadvantages and to provide at least the advantages described below. Accordingly, an aspect of the present invention provides an apparatus and method for transmitting and receiving data without wasting memories of buffers during data transmission and reception in one-to-one communication.

In accordance with an aspect of embodiments of the present invention, an apparatus for transmitting and receiving data in one-to-one communication includes a first buffer for temporarily storing file data, a second buffer for temporarily storing message data indicating a response to the file data, a data transmitter for transmitting the file data and the message data, a data receiver for receiving the file data and the message data, a buffer connector for connecting the first buffer to one of the data transmitter and the data receiver and connecting the second buffer to the other one of the data transmitter and the data receiver, and a controller for controlling, according to a data transmission or reception mode, the buffer connector to connect the first buffer to one of the data transmitter and the data receiver and to connect the second buffer to the other one of the data transmitter and the data receiver.

In accordance with another aspect of embodiments of the present invention, a method for transmitting and receiving data in one-to-one communication in a data transmission and reception apparatus which includes a first buffer for temporarily storing file data, a second buffer for temporarily storing message data indicating a response to the file data, a data transmitter for transmitting the file data and the message data, and a data receiver for receiving the file data and the message data, includes selecting one of a data transmission mode and a data reception mode, and connecting the first buffer to one of the data transmitter and the data receiver and connecting the second buffer to the other one of the data transmitter and the data receiver, according to a selection result.

BRIEF DESCRIPTION OF THE DRAWINGS

The above and other aspects, features and advantages of embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

Figure 1:
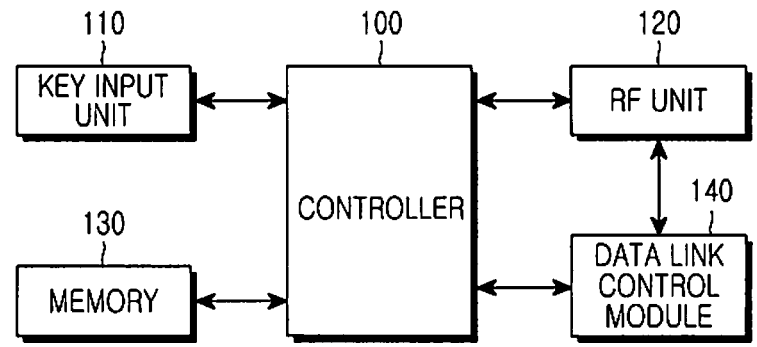
FIG. 1 is a block diagram illustrating a configuration of a mobile communication terminal according to an embodiment of the present invention.

FIG. 1 is a block diagram illustrating a configuration of a mobile communication terminal for transmitting and receiving a large amount of data according to an embodiment of the present invention.

The mobile communication terminal includes a controller 100, a key input unit 110, a Radio Frequency (RF) unit 120, a memory 130, and a data link control module 140.

The controller 100 controls an operation of the mobile communication terminal. If there is a key input for transmitting and receiving data through the key input unit 110, the controller 100 transmits a control signal for transmitting and receiving data to the data link control module 140. In this case, the control signal is a signal which indicates that the mobile communication terminal is in a data transmission mode for transmitting data or in a data reception mode for receiving data and controls the data link control module 140 to transmit or receive data.

If there are key inputs for selecting data to he transmitted and transmitting the data, the controller 100 may perform an operation of transmitting the selected data.

For example, if a key input for transmitting data is received through the key input unit 110 together with a key input for selecting data to be transmitted, the controller 100 transmits data selected for transmission to the data link control module 140 from the memory 130 and stores a response message to data transmission, transmitted to the data link control module 140 from the RF unit 120, in the memory 130. In this case, data to be transmitted may be directly transmitted to the data link control module 140 from the memory 130 without passing thought the controller 100.

During data reception, the controller 100 stores in the memory 130 data transmitted through the data link control module 140 from the RF unit 120, generates a response message to data reception, and transmits the response message to the link control module 140. A response messages to data transmission or reception includes an ACK message indicating that data has been normally transmitted or received and a NACK message indicating that data has not been normally transmitted or received. Such a response message is a sort of data.

The key input unit 110 includes a key for data transmission and a key for data reception and transmits data of a key value corresponding to a key pressed by a user to the controller 100. For example, a user may input a key for selecting data and then input the key for data transmission through the key input unit 110, so that the controller 100 may perform an operation of transmitting the selected data. The key input unit 110 may be constructed such that the key for data transmission and the key for data reception are integrated into one key.

The RF unit 120 receives data from the exterior of the terminal and transmits the received data to the data link control module 140, when the mobile communication terminal is in a data reception mode for performing a data reception operation, Moreover, the RF unit 120 transmits a response message to data reception, transmitted from the controller 100, to the exterior of the terminal. When the mobile communication terminal is in a data transmission mode for performing a data transmission operation, the RF unit 120 transmits data transmitted from the data link control module 140 to the exterior of the terminal and transmits a response message to data transmission to the data link control module 140.

The memory 130 stores data used in the mobile communication terminal and stores data received from the exterior of the terminal. Especially, the memory 130 stores file data which is to be transmitted or is received and stores a received response message.

The data link control module 140 transmits or receives file data according to the data transmission mode or the data reception mode.

More specifically, the data link control module 140 receives a control signal for data transmission or reception data from the controller 110, when a key input for data transmission or reception is received from a user through the key input unit 110.

For example, upon receiving, from the memory 130, data to be transmitted, together with the control signal for data transmission from the controller 110, the data link control module 140 temporarily stores the received data and transmits the data to the RF unit 120.

In addition, upon receiving data from the RF unit 120 after reception of a control signal for data reception from the controller 110, the data link control module 140 temporarily stores the received data and transmits the data to the memory 130.

The above-described data link control module 140 will now be described in detail with reference to FIG. 2.

Figure 2:
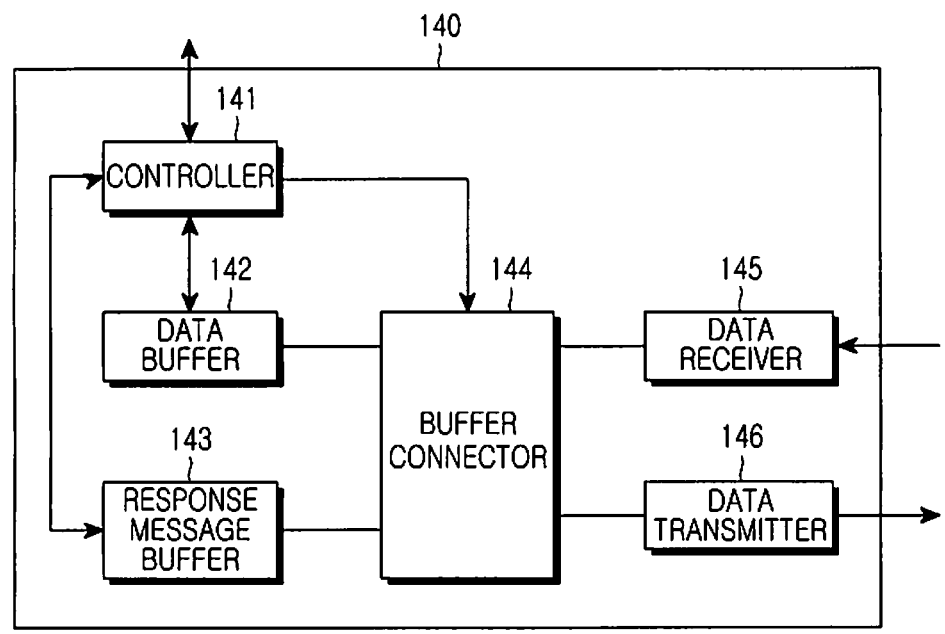
FIG. 2 is a block diagram illustrating a configuration of a data link control module according to an embodiment of the present invention.

FIG. 2 is a block diagram illustrating a configuration of the data link control module 140 according to an embodiment of the present invention.

The data link control module 140 includes a controller 141, a data buffer 142, a response message buffer 143, a buffer connector 144, a data receiver 145, and a data transmitter 146.

Figure 3A:
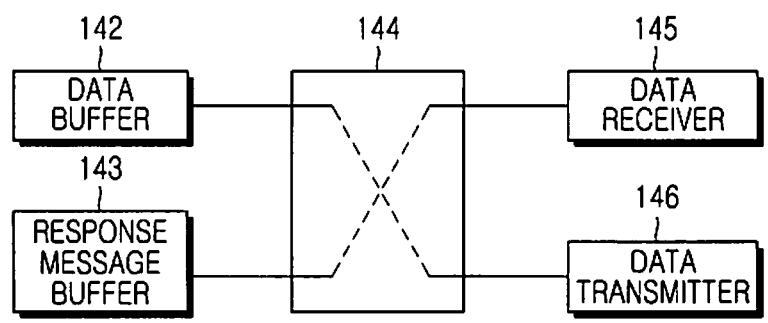
FIG. 3A is a diagram explaining an operation of a buffer connector during a data transmission mode according to an embodiment of the present invention.

Referring to FIG. 2, if a control signal for data transmission is input from the controller 100 of the mobile communication terminal, the controller 141 of the data link control module 140 controls the buffer connector 144 to connect the data buffer 142 with the data transmitter 146 and to connect the response message buffer 143 with the data receiver 145. The connected data buffer 142 and the data transmitter 146, and the response message buffer 142 and the data receiver 145 may be shown as in FIG. 3A.

Upon receiving data to be transmitted, the controller 141 temporarily stores file data in the data buffer 142 and transmits the stored file data to the data transmitter 146 connected to the data buffer 142, so that the data transmitter 146 transmits the file data to the RF unit 120.

Next, upon receiving a response message to the transmitted file data, transmitted from the data receiver 145 through the RF unit 120, the controller 141 temporarily stores the received response message in the response message buffer 143 and transmits the response message to the memory 130. The response message may be directly transmitted to the memory 130 without passing through the controller 141.

Figure 3B:
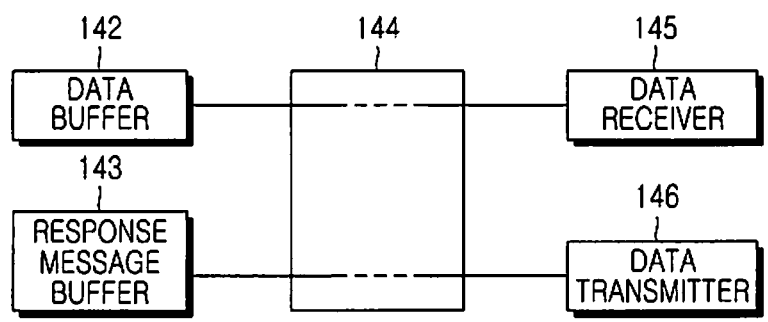
FIG. 3B is a diagram explaining an operation of a buffer connector during a data reception mode according to an embodiment of the present invention.

Upon receiving a control signal for data reception from the controller 100 of the mobile communication terminal, the controller 141 controls the buffer connector 144 to connect the data buffer 142 to the data receiver 145 and to connect the response message buffer 143 to the data transmitter 146. The connected data buffer 142 and the data receiver 145, and the response message buffer 143 and the data transmitter 146 may be shown as in FIG. 3B.

Next, when receiving file data from the data receiver 145 through the RF unit 120, the controller 141 temporarily stores the received file data in the data 30 buffer 142 and transmits the stored file data to the memory 130. The file data may be directly transmitted to the memory 130 without passing through the controller 141.

Upon receiving a response message to data reception from the controller 100 of the mobile communication terminal, the controller 141 temporarily stores the received response message in the response message buffer 143. The controller 141 transmits the stored response message to the data transmitter 146 connected to the response message buffer 143 and then the data transmitter 146 transmits the response message to the RF unit 120.

The data buffer 142 is connected, in a data transmission mode, to the data transmitter 146 to temporarily store file data to be transmitted. The data buffer 142 is connected, in a data reception mode, to the data receiver 145 to temporarily store received file data.

The response message buffer 143 is connected, in a data transmission mode, to the data receiver 145 to temporarily store a received response message. The response message buffer 143 is connected, in a data reception mode, to the data transmitter 146 to temporarily store a response message to be transmitted.

In this way, since the data buffer 142 and the response message buffer 143 store data, and file sizes thereof are different, the data buffer 142 is constructed with a larger size relative to the response message buffer 143.

The buffer connector 144 connects the data buffer 142 to the data transmitter 146 and connects the response buffer 143 to the data receiver 145, upon receiving a control signal for data transmission from the controller 141. Moreover, the buffer connector 144 connects the data buffer 142 to the data receiver 145 and connects the response message buffer 143 to the data transmitter 25 146, upon receiving a control signal for data reception from the controller 141.

The data receiver 145 receives data from the RF unit 120 or receives a response message to data transmission.

The data transmitter 146 transmits data received from the data buffer 142 to the RF unit 120 or transmits a response message to data reception, received from the response message buffer 143, to the RF unit 120.

As appreciated from the foregoing description, since the size of a buffer is constructed to be suitable for the size of data stored temporarily during data transmission or reception, the buffer can be maximally utilized without wasting a memory thereof.

A process in which the mobile communication terminal transmits and receives data in one-to-one communication will now be described with reference to FIG. 4.

Figure 4:
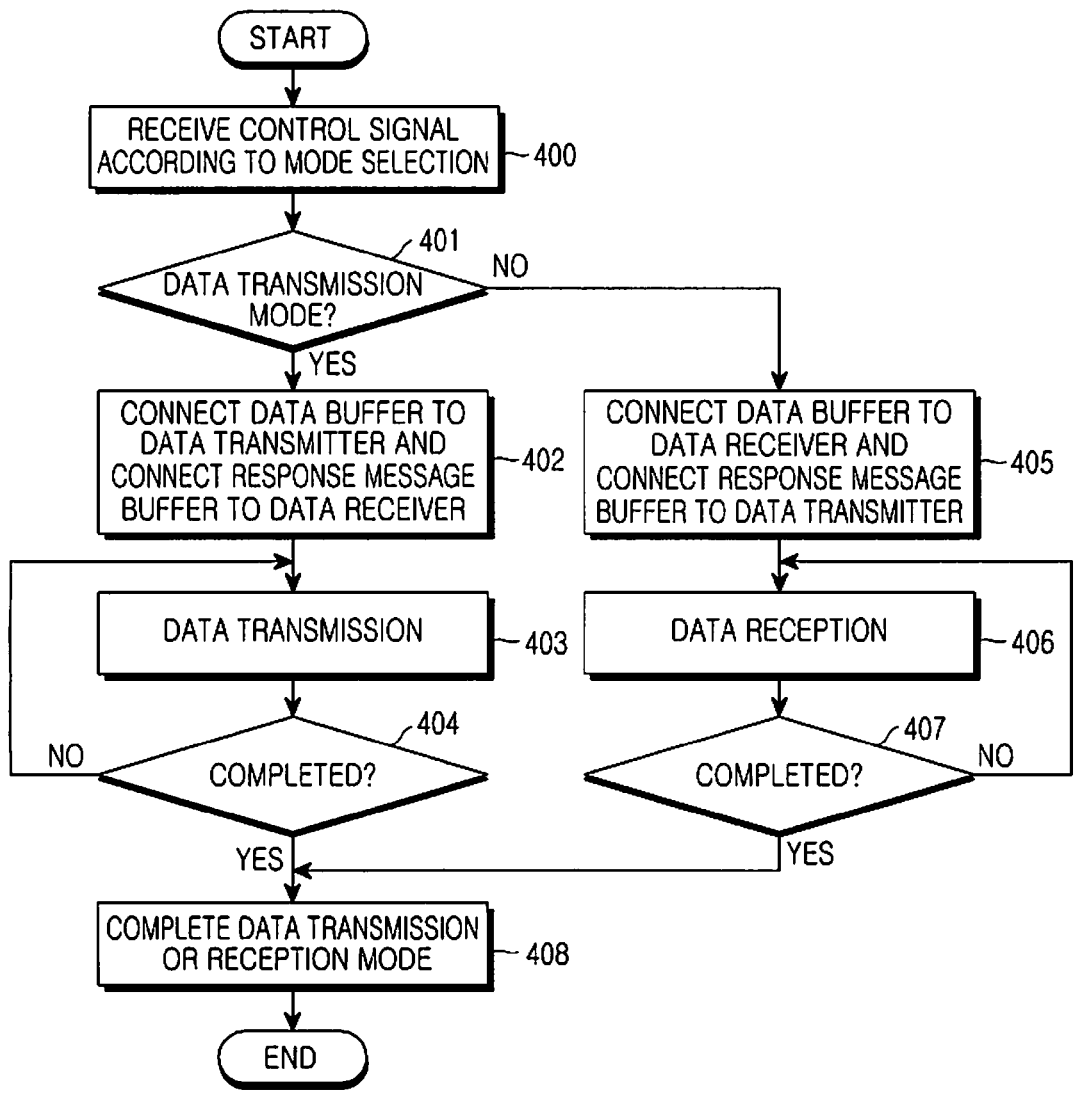
FIG. 4 is a flow chart illustrating a process for transmitting or receiving file data in a data link control module during a data transmission or reception mode according to an embodiment of the present invention.

FIG. 4 is a flow chart illustrating a process for transmitting or receiving file data in one-to-one communication in a mobile communication terminal according to an embodiment of the present invention.

If a user selects, through the key input unit 110, a data transmission mode for data transmission or a data reception mode for data reception, the controller 100 of the mobile communication terminal transmits a control signal for the selected mode to the controller 141 of the data link control module 140 in step 400.

In step 401, the controller 141 of the data link control module 140 determines if the selected mode is a data transmission mode or not. If the selected mode is a data transmission mode, the controller 141 proceeds to step 402. If the selected mode is not a data transmission mode, that is if it is a data reception mode, the controller 141 proceeds to step 405.

In step 402, the controller 141 controls the buffer connector 144 to connect the data buffer 142 to the data transmitter 146 and to connect the response message buffer 143 to the data receiver 145.

In step 403, the controller 141 performs a data transmission operation. In more detail, the controller 141 temporarily stores file data to be transmitted in the data buffer 142 and transmits the stored file data to a file receiver through the data transmitter 146 connected to the data buffer 142. If a response message is received from the file receiver through the data receiver 145, the controller 141 temporarily stores the received response message in the response message buffer 143 connected to the data receiver 145 and transmits the response message to the memory 130. The data buffer 142 has a memory space which can store a large amount of file data and the response message buffer 143 has a memory space which can store the response message.

In step 404, the controller 141 determines whether data transmission has been completed. If data transmission has been completed, the controller 141 proceeds to step 408 and if not, it returns to step 404 to continue to perform the data transmission operation.

Meanwhile, if the selected mode is a data reception mode in step 401, the controller 141 controls the buffer connector 144 to connect the data buffer 142 to the data receiver 145 and to connect the response message buffer 143 to the data transmitter 146 in step 405.

The controller 141 performs a data reception operation in step 406. In more detail, the controller 141 receives file data from a file transmitter trough the data receiver 145, temporarily stores the received file data in the data buffer 142 connected to the data receiver 145, and transmits the file data to the memory 130. Upon receiving a response message to the received file data from the controller 100 of the mobile communication terminal, the controller 141 temporarily stores the response message in the response message buffer 143 and transmits the stored response message to the file transmitter through the data transmitter 146.

In step 407, the controller 141 determines whether data reception has been completed. If data reception has been completed, the controller 141 proceeds to step 408 and if not, it returns to step 406 to continue to perform the data reception operation.

The controller 141 proceeding to step 408 from steps 404 and 407 completes the data transmission or reception mode to end the data transmission or reception operation.

According to the embodiments of the present invention, a buffer for storing transmitted and received file data is constructed to be large in size relative to a buffer for storing a response message to the file data, according to a data transmission mode or a data reception mode. Accordingly, a memory capacity of a buffer can be saved and the miniaturization and high-speed communication of a portable terminal device can be achieved.

As described above, a buffer for data transmission and a buffer for data reception are differently constructed according to the amount of data. Therefore, it is possible to maximally use the buffers without wasting memory spaces thereof.

Furthermore, since the sizes of buffers for data transmission and reception are constructed to be suitable for the amount of transmitted and received data, the portable terminal device can be miniaturized and data can be transmitted and received at high speed.

Although the embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. An apparatus for transmitting and receiving data in one-to-one communication, comprising:
   a first buffer for temporarily storing file data;
   a second buffer for temporarily storing message data indicating a response to the file data;

a data transmitter for transmitting the file data and the message data;

a data receiver for receiving the file data and the message data;

a buffer connector for connecting the first buffer to one of the data transmitter and the data receiver and connecting the second buffer to the other one of the data transmitter and the data receiver; and a controller for determining whether a selected mode is a data transmission mode or a data reception mode, for controlling the buffer connector to connect the first buffer to the data transmitter and to connect the second buffer to the data receiver according to the determination that the selected mode is the data transmission mode, and for controlling the buffer connector to connect the first buffer to the data receiver and to connect the second buffer to the data transmitter according to the determination that the selected mode is the data reception mode.

2. The apparatus of claim 1, wherein, during the data transmission mode, the first buffer temporarily stores file data to be transmitted and transmits the file data to the data transmitter, and the second buffer temporarily stores message data received through the data receiver as a response to the file data transmitted from the data transmitter.

3. The apparatus of claim 1, wherein, during the data reception mode, the first buffer temporarily stores file data received through the data receiver, and the second buffer temporarily stores message data which is to be transmitted as a response to the received file data and transmits the message data to the data transmitter.

4. The apparatus of claim 1, wherein the first buffer is larger in size than the second buffer.

5. A method for transmitting and receiving data in one-to-one communication in a data transmission and reception apparatus which includes a first buffer for temporarily storing file data, a second buffer for temporarily storing message data indicating a response to the file data, a data transmitter for transmitting the file data and the message data, and a data receiver for receiving the file data and the message data, the method comprising:

selecting one of a data transmission mode and a data reception mode;

determining whether the selected mode is the data transmission mode or the data reception mode;

connecting the first buffer to the data transmitter and connecting the second buffer to the data receiver, according to the determination that the selected mode is the data transmission mode; and connecting the first buffer to the data receiver and connecting the second buffer to the data transmitter, according to the determination that the selected mode is the data reception mode.

6. The method of claim 5, when the data transmission mode is selected, further comprising:

temporarily storing the file data to be transmitted in the first buffer and outputting the stored file data through the data transmitter;

receiving the message data through the data receiver as a response to the file data transmitted from the data transmitter; and temporarily storing the received message data in the second buffer.

7. The method of claim 5, when the data reception mode is selected, further comprising:

receiving the file data from the data receiver;

temporarily storing the received file data in the first buffer;

temporarily storing the message data as a response to the received file data in the second buffer; and outputting the message data stored temporarily in the second buffer through the data transmitter.

8. The method of claim 5, wherein the first buffer is larger in size than the second buffer.

* * * * *